United States Patent
Walker

(10) Patent No.: US 7,734,472 B2
(45) Date of Patent: Jun. 8, 2010

(54) SPEECH RECOGNITION ENHANCER

(75) Inventor: Michael Walker, Lichtenwald (DE)

(73) Assignee: Alcatel, Paris (FR)

( * ) Notice: Subject to any disclaimer, the term of this patent is extended or adjusted under 35 U.S.C. 154(b) by 1106 days.

(21) Appl. No.: 10/951,594

(22) Filed: Sep. 29, 2004

(65) Prior Publication Data

US 2005/0119886 A1    Jun. 2, 2005

(30) Foreign Application Priority Data

Nov. 27, 2003    (EP)    ................................. 03292957

(51) Int. Cl.
- G10L 15/00    (2006.01)
- G10L 19/04    (2006.01)
- G10L 21/00    (2006.01)

(52) U.S. Cl. ........................ 704/278; 704/211; 704/231; 704/234; 704/236

(58) Field of Classification Search ................. 704/211, 704/234, 278
See application file for complete search history.

(56) References Cited

U.S. PATENT DOCUMENTS

| | | | | |
|---|---|---|---|---|
| 4,737,976 A * | 4/1988 | Borth et al. | ................. | 455/563 |
| 6,032,115 A | 2/2000 | Kanazawa et al. | | |
| 6,067,516 A * | 5/2000 | Levay et al. | ................. | 704/244 |
| 2002/0029141 A1 * | 3/2002 | Cox et al. | ................... | 704/220 |

FOREIGN PATENT DOCUMENTS

EP    0 586 996 A2    3/1994

OTHER PUBLICATIONS

David Pearce, 'Enabling New Speech Driven Services for Mobile Devices: An overview of the ETSI standards activities for Distributed Speech Recognition Front-ends', AVIOS 2000: The Speech Applications Conference, May 22-24, 2000 San Jose, CA, USA; 12 Pages.*

Anonymous: "Threshold Control for Speech Analyzer. Feb. 1971" IBM Technical Disclosure Bulletin, vol. 13, No. 9, Feb. 1, 1971, pp. 2555-2556, XP002277981, New York, U.S.

Van Wyk G et al: "A real time, speaker independent, speech recognition system" Communications and Signal Processing, 1991. COMSIG 1991 Proceedings., South African Symposium on Pretoria, South Africa Aug. 30, 1991, New York, NY USA, IEEE, US, 1991, pp. 120-125, XP010045361.

* cited by examiner

Primary Examiner—David R Hudspeth
Assistant Examiner—Justin W Rider
(74) Attorney, Agent, or Firm—Sughrue Mion, PLLC

(57) ABSTRACT

The invention concerns a speech recognition enhancer (51) and a speech recognition system comprising such speech recognition enhancer (51), an audio input unit (41) and a speech recognizer (61, 3). The speech recognition enhancer (51) is arranged between the audio input unit (41) and the speech recognizer (61, 3). The speech recognition enhancer (51) has a parametrizable pre-filtering unit (511), a parametrizable dynamic voice level control unit (512), a parametrizable noise reduction unit (513) and a parametrizable voice level control unit (514). The parameters of these parametrizable units (511, 512, 513, 514) are adjusted to the characteristics of the specific audio input unit (41) and/or the characteristics of the specific speech recognizer (61, 3) for adapting the audio input unit (41) to the speech recognizer (61, 3).

12 Claims, 2 Drawing Sheets

SPEECH RECOGNITION ENHANCER

The invention is based on a priority application EP 03292957.2 which is hereby incorporated by reference.

BACKGROUND OF THE INVENTION

The present invention relates to a speech recognition system comprising an audio input unit arranged in a terminal and a speech recognizer, as well as a speech recognition enhancer for such speech recognition system.

Speech recognition systems are used in a wide application environment with a strong degradation of reliability with noise background. Many applications are needed in poor acoustic environment, for example telemetric systems in cars or vans, speech control systems at station airports and other public fields, and mobile phones in nearly every environment.

To improve the degradation of reliability with noise background, ETSI ES 202 050, V1.1.2 (2003-10) introduces selective spectra substraction methods used for noise reduction.

The input signal from the input audio part of a DSR terminal (DSR=Distributed Speech Recognition) is processed by the terminal front-end of the terminal. The terminal front-end develops a feature vector from a speech wave sampled at different rates, wherein the feature vectors consist of 13 static cepstral coefficient and a log-energy coefficient. In the terminal part, speech features are computed from the input signal in the feature extraction part. Then, features are compressed and further processed for general transmission through the server side. In the feature extraction part, noise reduction is performed first. Then, wave form processing is a applied to the de-noise signal and cepstral features are calculated. At the server side, bit-stream decoding, error mitigation and feature decompression are applied.

Noise reduction is based on a Wiener filter. After framing the input signal, the linear spectrum of each frame is estimated. In a power spectral density mean block, the signals spectrum is smoothed along the time index. Then, in the Wiener filter design block, frequency domain Wiener filter coefficients are calculated by using both the current frame spectrum estimation and the noise spectrum estimation. The noise spectrum is estimated from noise frames, which are detected by a voice activity detector. Linear Wiener filter coefficients are further smoothed along the frequency axis by using a Mel Filter-Bank. The impulse response of this Mel-warped Wiener filter is obtained by applying a Mel-warped inverse discrete cosine transform. Finally, the signal is filtered in an Apply filter block. The input signal of the second stage is the output signal from the first stage, wherein the second stage comprises a spectrum estimation block, a Power Spectral Density Mean block a Wiener filter Design block, a Mel Filter-Bank block, a gained factorization block, a Mel-warped inverse discrete cosine transform block and a Apply filter block.

Disadvantages of such approach improving the degradation by means of selective spectral subtraction methods are the high computation and memory efforts and the inflexibility of the system.

SUMMARY OF THE INVENTION

It is the object of the present invention to improve the degradation of reliability of a speech recognition system which has to work with noisy background.

The object of the present invention is achieved by a speech recognition system comprising an audio input unit arranged in a terminal, a speech recognizer and an adjustable speech recognition enhancer arranged in-between the audio input unit and the speech recognizer, wherein the speech recognition enhancer having a parametrizable pre-filtering unit, a parametrizable dynamic voice level control unit, a parametrizable noise reduction unit and a parametrizable voice level control unit, wherein the parameters of the parametrizable pre-filtering unit, the parametrizable dynamic voice level control unit, the parametrizable noise reduction unit and the parametrizable voice level control unit are adjusted to the characteristics of the specific audio input unit and/or the characteristics of the specific speech recognition unit of the speech recognition system for adapting the audio input unit to the speech recognizer. The object of the present invention is further achieved by a speech recognition enhancer for arrangement in-between an audio input unit and a speech recognizer, the speech recognition enhancer having a parametrizable pre-filtering unit, a parametrizable dynamic voice level control unit, a parametrizable noise reduction unit and a parametrizable voice level control unit, wherein the parameters of the parametrizable pre-filtering unit, parametrizable dynamic voice level control unit, parametrizable noise reduction unit and parametrizable voice level control unit are adjustable to the characteristics of the specific audio input unit and/or the characteristics of the specific speech recognizer for adapting the audio input unit to the speech recognizer.

The invention bases on the cognition that an improved recognition rate is only achievable if a speech enhacement method with configurable parametration is used. Such speech recognition enhancement method needs different adjustable system functions, which have to be tunable dependent on the application and system combination. Different speech recognizers use different approaches for the HMM configuration (HMM=Hidden Marker Model). Different front-end concepts, for example sound cards, microphone, mobile phones and telephones, result in different transfer characteristics. An effective noise reduction needs an additive system adapting the HMM configuration and the front-end concepts.

Various advantages are achieved by the invention: The invention opens a powerful way to improve the recognition rate in noisy environments combined with very low computation efforts. The invention facilitates the introduction of new adaptation and parameterization procedures for highly different hardware and software combinations of speech recognition systems. The voice signal has not to be processed in the frequency domain which results in a low computation complexity (<1 MIP) and low memory requirements (500 Bytes). Further, experiments show a high improvement of recognition rate. Further, it is possible to implement the invention within a plurality of existing systems. It may be implemented as add-on feature for many applications. Easy adaptation to desire hardware/software configuration is feasible. Further, separate parameterizations for speech recognizer and adaption to the human ear are feasible.

Further advantages are achieved by the embodiments indicated by the dependent claims.

Specific advantages are achieved if the invention is applied on a distributed speech recognition system. Within such kind of system, the speech recognizer is composed of a central speech recognition server and at least one remote distributed speech recognition front-end performing the process of feature extraction. The distributed speech recognition front-end is located in a respective terminal having a respective speech recognition enhancer and a respective audio input unit. The speech recognition enhancer is arranged between the specific audio input unit and the specific distributed speech recognition front-end of the terminal. The parameters of the parametrizable pre-filtering unit, parametrizable dynamic voice level control unit, parametrizable noise reduction unit and parametrizable voice level control unit of each of the speech recognition enhancers are adjusted to the characteristics of the respective audio input unit and/or the characteristics of the respective distributed speech recognition front-end of the respective terminal. This makes it possible to drastically improve speech recognition within a speech recognition system having a plurality of audio unit/distributed speech recognition front-end combinations.

But, it is also possible to apply the invention on stand-alone speech recognition system, wherein the speech recognizer is embedded in the terminal.

Further advantages are achieved if the speech recognition enhancer solely pre-processes the speech wave forms in the time domain. For example, the audio input unit contains a microphone and an analogue to digital convert. The speech recognition enhancer pre-processes the output signal of the analogue to digital convert in the time domain. The speech recognizer performs a transformation of the speech signal provided by the speech recognition enhancer from the time domain to the frequency domain and performs further processing of the transformed speech signal in the frequency domain. Thereby, it is still possible that the speech recognizer applies a further noise reduction algorithm based on selective spectral subtraction methods. Experiments based on the Aurora database show that such computation in the time domain are a good compromise between low computation complexity and high improvement of the degradation.

Preferably, the noise reduction unit has a voice activity detector and an amplifier controlled by the voice activity detector. When detecting speech pauses, the voice activity detector reduces the amplification factor of the amplifier. An excellent improvement of degradation is achievable by using such kind of parametrizable noise reduction unit.

Preferably, the aforementioned noise reduction unit is combined with a dynamic voice level control unit that performs a dynamic voice level compression of the output signal of the pre-filtering unit. For example, parameters specifying a compression factor and a nominal voice level control the dynamic voice level compression function. Thereby, the output signal of the pre-filtering unit is adapted to the characteristics of the human ear which provides an excellent basis for the following noise reduction process.

Preferably, the speech recognition enhancer is implemented as computer program executed by a DSP of the terminal (DSP=Digital Signal Processor). The size, computation complexity and memory requirements of this computer program makes it possible to execute this computer program on the same DSP, which executes the computer program providing the speech recognizer or distributed speech recognition front-end functionalities. Thereby, no additional hardware-resources have to be provided within the terminal to implement this invention which drastically improves the degradation within noisy backgrounds.

BRIEF DESCRIPTION OF THE DRAWINGS

These as well as other features and advantages of the invention will be better appreciated by reading the following detailed description of presently preferred exemplary embodiments taken in conjunction with accompanying drawings of which.

DESCRIPTION OF THE DRAWINGS

Figure 1:
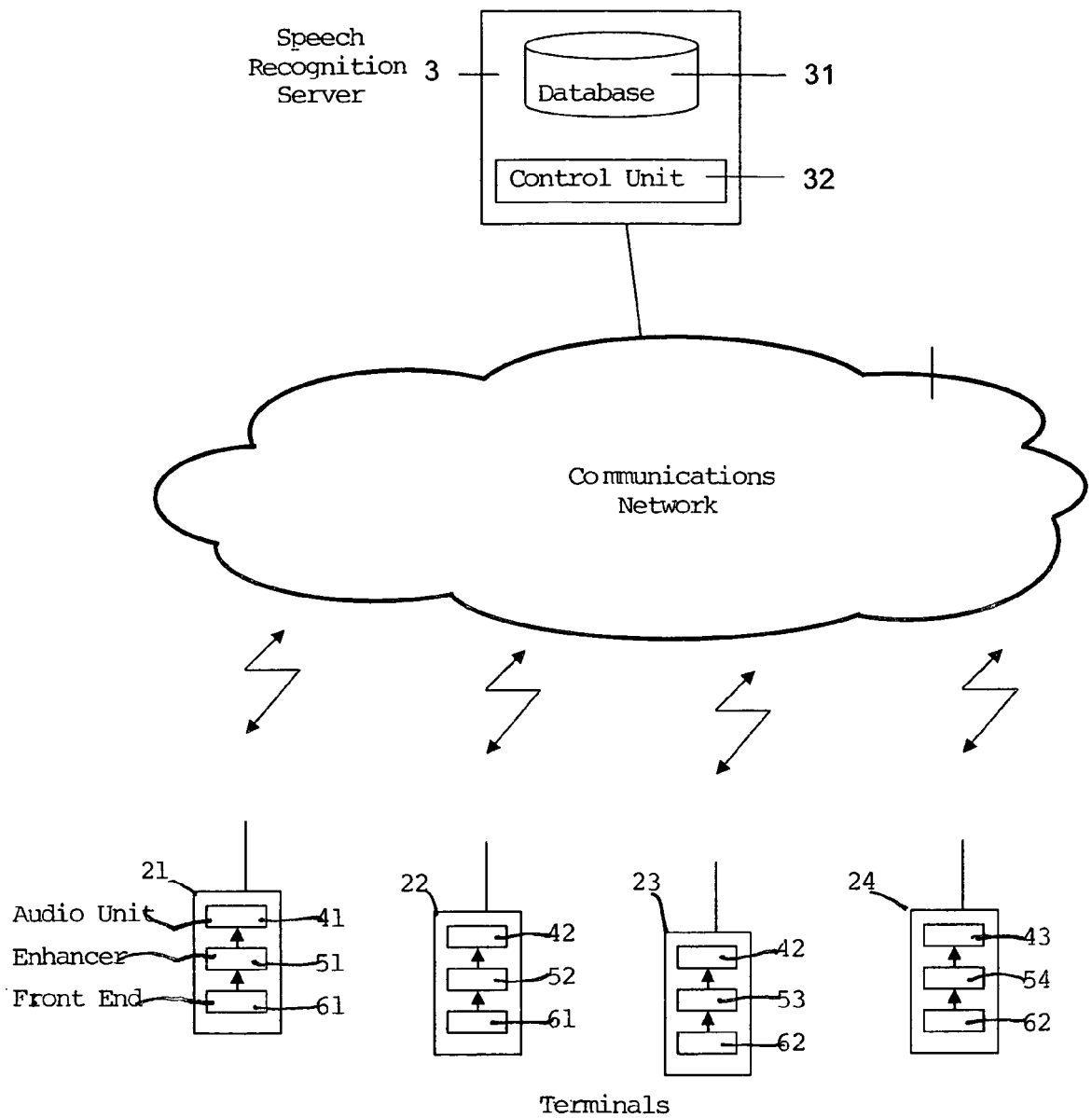
FIG. 1 is a block diagram showing a distributes speech recognition system with speech recognition enhancers according to this invention.

FIG. 1 shows various components of a distributed speech recognition system according to this invention. FIG. 1 shows a communication network 1, a plurality of terminals 21, 22, 23 and 24, and a speech recognition server 3. The terminals 21, 22, 23 and 24 comprises distributed speech recognition front-ends 61 and 62, speech recognition enhancers 51, 52, 53 and 54 and audio units 41, 42 and 43, respectively. The speech recognition server 3 comprises a database 31 and a control unit 32.

The communication network 1 is a telephone network, preferably a mobile telecommunication network. For example, the communication network 1 is a GSM, UMTS or CDMA 2000 network (GSM=Global System for Mobile Communications, UMTS=Universal Telecommunications System). Further, it is possible that the communication network 1 is a PSTN or ISDN network (PSTN=Public Switched Telecommunication Network; ISDN=Integrated Service Digital Network). According to a further embodiment, the communication network 1 is a data network, for example an IP-network constituted by various different physical networks linked via a common level 3 IP protocol (IP=Internet Protocol).

The terminals 21, 22, 23 and 24 are terminals comprising communication capabilities for communicating via the communication network 1 with the speech recognition server 3. For example, the terminals 21, 22, 23 and 24 are cellular phones according to one of the above-referenced standards.

Besides the basic functionalities of a cellular phone, the terminals 21, 22, 23 and 24 are upgraded with distributed speech recognition capabilities. From functional point of view, three units of the terminal are involved in provisioning of this service: The distributed speech recognition front-end, the speech recognition enhancer and the audio unit.

The audio unit refers to everything that occurs during the conversion of the sound pressure way form to a digitized signal. This unit includes the microphone, analogue to digital conversion and, optionally, analogue filtering and automatic gain control. Further, the characteristics of the audio input unit are influenced by the acoustical effects caused by the housing of the terminal and the mechanical coupling of the microphone to the housing.

Preferably, the audio input unit operates inside the tolerances recommended for the distributed speech recognition front-end.

Each of the terminal 21, 22, 23 and 24 have a distributed speech recognition front-end performing central functions of speech recognition. Basically, the distributed speech recognition front-end executes the process of feature extraction. For example, it executes the functions of parameterization, compression, error protection and formatting: A frame based speech processing algorithm generates a feature vector representation. Such feature vector representation is, for example, specified in the standard ETSI ES 202 050 V1.1.2 (2003-10). Then, the feature vector is compressed to reduce the data rate and error protection bits are added. Then, the compressed speech frames are formatted into a bit stream for transmission, wherein it is possible to transmit these data as circuit data or packet data to the server 3 via the communication network 1.

The control unit 32 performs the server side DSR processing (DSR=Distributed Speech Recognition): It applies an error detection and mitigation function. Then, applies decompression, server side front-end post processing and a featured derivatives function on the received data.

As shown in FIG. 1, the terminals 21, 22, 23 and 24 respectively comprise different audio input units and different distributed speech recognition front-ends.

For example, the distributed speech recognition front-ends 61 and 62 are encoded by different suppliers and use different approaches for HMM configuration. For example, the terminals 21, 22 and 24 are different types of terminals each having its own electro acoustical characteristics. Consequently, each of the terminals 21 to 24 implement an unique combination of distributed speech recognition type and audio input unit type.

Each of the speech recognition enhancers 51 to 54 operates with a different parameter set adjusted for adapting the audio input unit of the terminal to the distributed speech recognition front-end of the terminal. The speech recognition enhancer 51 adapts the audio unit 41 to the distributed speech recognition front-end 61, the speaker recognition enhancer 52 adapts the audio unit 42 to the distributed speech recognition front-end 61, the speech recognition enhancer 53 adapts the audio unit 42 to the distributed speech recognition front-end 62 and the speech recognition enhancer 54 adapts the audio unit 43 to the distributed speech recognition front-end 62. Each of the speech recognition enhancers 51 to 54 has a parametrizable pre-filtering unit, a parametrizable dynamic voice level control unit, a parametrizable noise reduction unit and a parametrizable voice level control unit. The parametrization of these units is adjusted to the characteristics of the respective one of the audio input units 41 to 43 and/or the characteristic of the specific speech recognizer, constituted by the respective one of the distributed speech recognition front-ends 61 and 62 and the server 3.

For example, speech recognition is realized with an ATIP recognizer. Thus, the HMM's are trained according to the rules of ATIP. This is the first variable which can effect the sensitivity of the recognition. For this setting it can become necessary to compress the input dynamic of the speech signal e.g. by factor 3/1 to achieve better recognition rate.

Alternatively, the speech recognition can, for example be realized with a recognizer of Lernout & Hauspic, Speechworks, TEMIC or Nuance that are trained according to the rules of Lernout & Hauspic, Speechworks, TEMIC and Nuance, respectively.

A second variable depends on the representation of the speech coefficients. For example, a Nokia distributed speech recognition front-end is used, performing a logarithm frequency weighting (Cepstrum). Thus, the compression may be reduced to 2/1. Further, the sensitivity for noise is very high. Noise reduction is needed, with a noise reduction degree of 30% determining the third variable. As the HW transfer function inclusive microphone has low-pass characteristic, a pre-filtering is needed to compensate the frequency response (fourth variable) and as the sound blaster card introduces permanent low distortion frequencies, a fifth variable determines the cut of frequency.

The specific selection for the five aforementioned variables are met by the parameterization of the speech recognition enhancer to adjust the speech recognition enhancer to the characteristics of the specific audio input unit and the characteristics of the specific speech recognizer.

Further, the invention is not limited to a distributed speech recognition system as shown by FIG. 1, but may also be applied on a stand-alone speech recognition system, wherein a complete speech recognizer, a speech recognition enhancer and an audio unit are implemented in a terminal, for example in the terminal 1.

Figure 2:
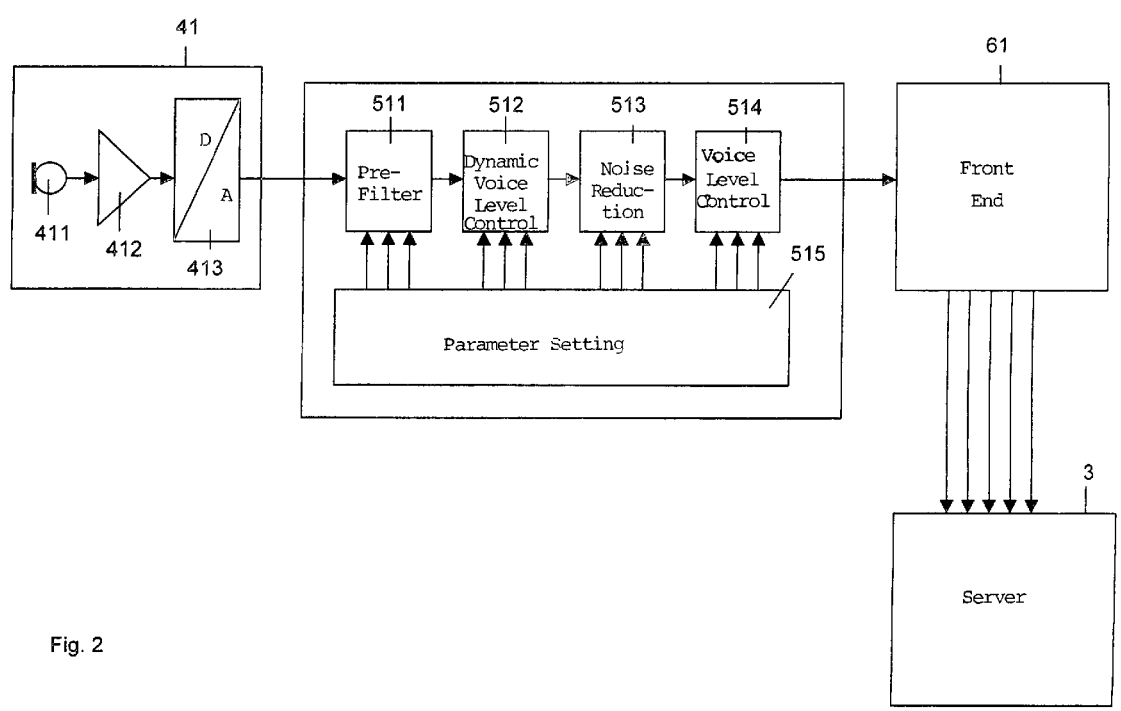
FIG. 2 is a functional view of a speech recognition system according to this invention.

FIG. 2 shows details of a speech recognition system composed of the audio unit 41, the speech recognition enhancer 51, the distributed speech recognition front-end 61 and the server 3.

The audio unit 41 has a microphone 411, an amplifier 412 and an analogue to digital converter 413, for example supporting sampling frequency of 8, 11 and 16 kHz.

The speech recognition enhancer 51 comprises a pre-filtering unit 511, a dynamic voice level control unit 512, a noise reduction unit 513 and a voice level control unit 514, wherein each of these units is parametrizable by a parameter setting unit 515. The parameters of these units are set by the parameter setting unit 515, wherein the parameter setting unit can be formed by parameter settings stored in an EPROM, in an initialization file or another readable file accessible for the digital signal processor implementing the pre-filtering unit 511, the dynamic voice level control unit 512, the noise reduction unit 513 and the voice level control unit 514.

The pre-filtering unit 511 performs a high-pass, low-pass or band-pass filtering of the digital speech signal received from the audio input unit 41. The parameter settings assigned to the pre-filtering unit 511 specifies the filter characteristic of such filtering. Preferably, the parameters of the pre-filtering unit 511 are adjusted to the characteristics of the audio input unit 41, for example on the low-pass characteristics of the microphone 411. For example, the pre-filtering unit 511 has a parameter setting for implementing high-pass filtering of the received digital speech signal, with a turnover frequency of 50 to 500 Hz, second or third order.

The dynamic voice level control unit 512 performs a dynamic voice level compression of the output signal of the pre-filtering unit 511. The dynamic voice level control unit 512 does not change a voice signal having a nominal voice level or having a voice level which is lower than the nominal voice level.

If the dynamic voice level control unit receives a voice signal having a voice level greater than the nominal voice level, it compresses the voice signal. Dependent on the voice level, it lowers the level of the output signal in a linear way. It estimates the coming voice level, lowers the amplification factor applied to the input signal according to an estimated input signal level and re-adjusts the amplification factor to the nominal factor when estimating a reversion to the nominal signal level. Preferably, the response time for the re-adjustment to the nominal level is chosen much longer than that for re-adjustment to a higher signal level. For example, a response time of 65 ms is chosen for re-adjustment to nominal signal level.

The noise reduction unit 513 preferably applies a noise reduction algorithm reducing the noise in speech pauses. But, it is possible that the noise reduction unit 512 applies further voice reduction algorithms, for example subtracting a specific noise signal.

The noise reduction unit 513 comprises a voice activity detector and an amplifier controlled by the voice activity detector. The voice activity detector reduces the amplification factor of the amplifier when detecting a speech pause. Preferably, the voice activity detector operates according to the following principle:

The voice activity detector 513 calculates a short term output signal SAS(x), a medium-term output signal MAS(x) and a long-term output signal LAS(x) based on an input-signal x and a short-term level estimation, a medium-term level estimation and a long-term level estimation. A multiplication-coefficient is assigned to each of these output signals. Then, the output signals are multiplied with the associated multiplication-coefficient. The results of these operations compared by a comperator. A speech signal is detected, if SAS(x) and MAS(x) are greater than LAS(x). A speech pause is detected, if SAS(x) and/or MAS(x) become smaller than LAS(x). Preferably, the response time of the short-term, medium-term and long-term estimation should follow the psycho acoustic rules, e.g. mentioned in E. Zwick, "Psychoacoustic", Springer Verlag, ISBN 3-54011401-7. Further, it is possible to determine the short-term, medium-term and long-term estimation by an adaptive system, e.g. an neural network.

Preferably, the noise reduction unit 513 reduces the amplification factor according to an exponential function, if it detects the beginning of a speech pause. A value between 50 ms to 150 ms is chosen for the response time of such function to adapt the reduction to the characteristics of the human ear.

The parameters of these noise reduction algorithm are set by the parameter setting unit 515. Adjustable parameter are parameters of the level estimations, multiplication coefficients assigned to the output signals, amplification factor in case of speech pause, and response time of the amplification factor reduction.

The voice level control unit 514 contains an amplifier for adapting the voice level of the output signal of the noise reduction unit 513 to a voice level adapted to the characteristics of the distributed speech recognition front-end 61.

It is possible that some of the parameters specified in the parameter setting unit 515 initiates a deactivation of one or several of the pre-filtering unit 511, the dynamic voice level control unit 512, the noise reduction unit 513 and the voice level control unit 514, if such functionality is in the specific case not necessary to adapt the audio input unit to the specific speech recognizer.

The invention claimed is:

1. A speech recognition system comprising:
an audio input unit arranged in a terminal;
a speech recognizer;
an adjustable speech recognition enhancer, separate from and arranged between the audio input unit and the speech recognizer, comprising:
a parametrizable pre-filtering unit,
a parametrizable dynamic voice level control unit,
a parametrizable noise reduction unit,
a parametrizable voice level control unit, and
a parameter setting unit;
wherein the parameters of the parametrizable pre-filtering unit, the parametrizable dynamic voice level control unit, the parametrizable noise reduction unit and the parametrizable voice level control unit are adjusted by the parameter setting unit to the characteristics of the specific audio input unit and/or the characteristics of the specific speech recognizer of the speech recognition system for adapting the audio input unit to the speech recognizer,
wherein parameters set by the parameter setting unit are stored in a data storage, and
wherein the adjustable speech recognition enhancer is adapted to process speech wave forms only in the time domain.

2. The speech recognition system of claim 1,
wherein the speech recognition system is a distributed speech recognition system,
wherein the speech recognizer comprises:
a central speech recognition server and at least one remote distributed speech recognition front-end performing the process of feature extraction,
wherein the distributed speech recognition front-end is located in a respective terminal,
wherein the terminal comprises a respective speech recognition enhancer and a respective audio input unit,
wherein each speech recognition enhancer is arranged in-between the audio input unit and the distributed speech recognition front-end of the respective terminal, and
wherein the parameters of the parametrizable pre-filtering unit, the parametrizable dynamic voice level control unit, the parametrizable noise reduction unit and the parametrizable voice level control unit of each speech recognition enhancer are adjusted to the characteristics of the respective audio input unit and/or the characteristics of the respective distributed speech recognition front-end of the respective terminal for adapting the audio input unit of this terminal to the distributed speech recognition front-end of this terminal.

3. The speech recognition system of claim 1,
wherein the speech recognition system is a stand-alone speech recognition system, wherein the speech recognizer is embedded in the terminal.

4. The speech recognition system of claim 1,
wherein the audio input unit comprises a microphone and an analogue to digital converter, and
wherein the speech recognizer is adapted to perform a transformation of a speech signal from the time domain to the frequency domain and to perform further processing of the transformed speech signal in the frequency domain.

5. The speech recognition system of claim 1,
wherein the pre-filtering unit is adapted to perform high-pass filtering of the speech signal provided by the audio input unit, and
wherein the parameters of the pre-filtering unit are adjusted to the characteristics of the audio input unit, in particular to the characteristics of a microphone arranged in the terminal.

6. The speech recognition system of claim 1,
wherein the dynamic voice level control unit is adapted to provide a dynamic voice level compression of the output signal of the pre-filtering unit, the dynamic voice level compression depending on parameters specifying a compression factor and a nominal voice level.

7. The speech recognition system of claim 1,
wherein the noise reduction unit comprises a voice activity detector and an amplifier controlled by the voice activity detector, and
wherein the voice activity detector is adapted to reduce the amplification factor of the amplifier when detecting a speech pause.

8. The speech recognition system of claim 1,
wherein the voice level control unit contains an amplifier for adapting the voice level of the output signal of the noise reduction unit to a preset voice level adapted to the characteristics of the speech recognizer.

9. A speech recognition enhancer for arrangement separate from and between an audio input unit and a speech recognizer of a speech recognition system comprising
a parametrizable pre-filtering unit,
a parametrizable dynamic voice level control unit,
a parametrizable dynamic voice level control unit,
a parametrizable noise reduction unit, and
a parametrizable voice level control unit,
wherein the parameters of the parametrizable pre-filtering unit, the parametrizable dynamic voice level control unit, the parametrizable noise reduction unit and the parametrizable voice level control unit are adjustable by a parameter setting unit to the characteristics of the specific audio input unit and/or the characteristics of the specific speech recognizer for adapting the audio input unit to the speech recognizer, wherein parameters set by the parameter setting unit are stored in a data storage, wherein the speech recognition enhancer is adapted to process speech wave forms only in the time domain.

10. The speech recognition system of claim 2, wherein the central speech recognition server and the at least one remote distributed speech recognition front-end communicate via a communication network.

11. The speech recognition system of claim 10, wherein the communication network is one of a Global System for Mobile Communications (GSM) network, a Universal Telecommunications System (UMTS) network or a DCMA 2000 network.

12. The speech recognition system of claim 10, wherein the communication network is one of Public Switched Telecommunication Network (PSTN) or Integrated Service Digital Network (ISDN).

* * * * *